No. 860,523. PATENTED JULY 16, 1907.
F. W. CANALES.
TUBE CLEANER.
APPLICATION FILED JUNE 27, 1906.
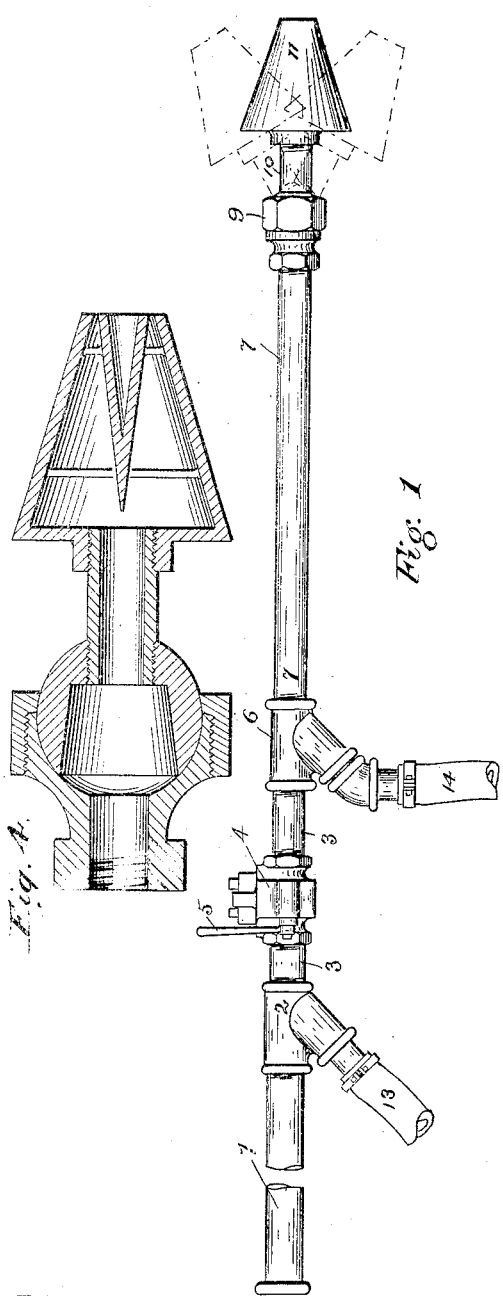
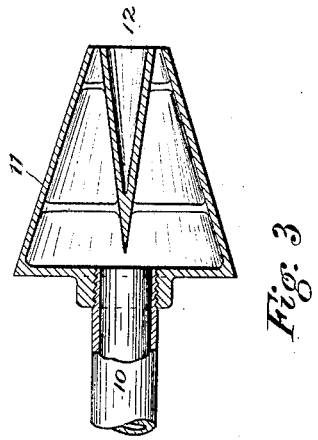
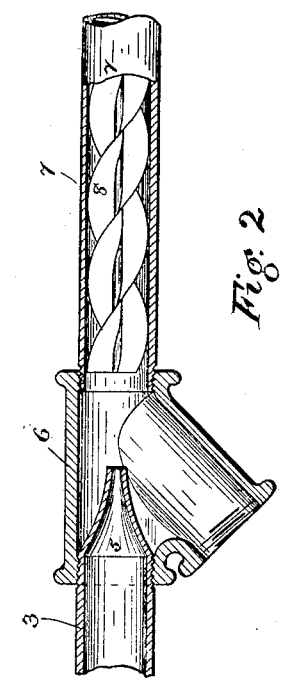
Witnesses:
A. C. Perry
A. G. McPherson
Inventor.
Frank W. Canales
by Geo. E. Bird
Atty.

UNITED STATES PATENT OFFICE.

FRANK W. CANALES, OF PORTLAND, MAINE, ASSIGNOR TO PERFECTION TUBE CLEANER COMPANY, OF CUMBERLAND COUNTY, MAINE, A CORPORATION OF MAINE.

TUBE-CLEANER.

No. 860,523.     Specification of Letters Patent.     Patented July 16, 1907.

Application filed June 27, 1906. Serial No. 323,582.

*To all whom it may concern:*

Be it known that I, FRANK W. CANALES, a citizen of the United States, residing at Portland, in the county of Cumberland and State of Maine, have invented an Improvement in Tube-Cleaners; and I hereby declare that the following is a full, clear, and exact description of the invention, which will enable others skilled in the art to which it appertains to make and use the same.

My invention relates to tube cleaners whereby the tubes of locomotive and other boilers may be cleaned expeditiously, safely and conveniently.

The mechanism in which I have embodied my invention consists in a tube provided at the operative end with a conical nozzle and with means for the introduction into said pipe of steam or compressed air, means whereby a current of atmospheric air may be introduced into said tube and means within said tube whereby a rotary motion may be given to the currents of air passing through it.

In the drawing: Figure 1 is a side elevation of the device; Fig. 2 is a longitudinal vertical section of a part of the device showing the Y connecting with the outer air, the spiral and the method of connecting the Y with the pipe in the rear; and Fig. 3 is a longitudinal vertical section of the nozzle. Fig. 4 is a longitudinal vertical section showing the ball joint.

To the handle 1, which may be used for convenience, is screwed, or otherwise secured, the pipe or Y 2 with provision at the open end of the Y for the connection therewith of a hose or pipe. Into the forward end of the Y 2 is screwed the pipe 3 which may or may not be provided with a throttle 4 having the ordinary means for closing and opening the same. It may be operated by the handle 5. The pipe 3 terminates in a nozzle or jet 5 of the ordinary construction: See Fig. 2. The outside is threaded to permit its being securely screwed into the Y 6 which is similar in construction to the Y 2 and has the same or similar means whereby a hose or pipe may be attached to the depending end. Another pipe 7, of sufficient length, is connected with the front end of the Y 6. Within this pipe 7 is rigidly fixed the spiral 8. The other end of the pipe 7 is screwed into and closely connected with the ball joint 9 which is provided within with a cup adapted to receive a hollow sphere, to one side of which is attached the pipe 10 connected with the nozzle, the other hemisphere being provided with slots. The cup and ball are so constructed as to permit movement, in any one plane, of about ninety degrees. To the outer or free end of the pipe 10 is secured the nozzle 11. This nozzle 11 consists of a hollow truncated cone within which is fixed the inverted cone 12. The inverted cone is so placed within the nozzle that its center shall coincide with the center of the truncated cone and the former is of such diameter as to leave an annular opening between the base of the inverted cone and the wall of the opening of the nozzle 11.

In operation, the hose 13 attached to the rearmost Y is connected with the steam or compressed air pipe, the handle 5 closing the throttle 4. The nozzle of the device is then placed within the end of the tube to be cleaned and held firmly against it and the throttle opened. At once the compressed air or steam enters the pipe and, passing through the jet 5 into the Y 6, there makes a vacuum which causes the atmospheric air to enter through the pipe 14. As the current of air or steam passes around the spiral 8 in the pipe 7 it receives a centrifugal motion whence it is forced through the sphere 10 into the nozzle 11 through the annular opening in which it issues while maintaining its centrifugal motion. The action of the rotary current of air upon the walls of the tube is such as to remove dirt and all other ordinary obstructions, scour it and render it perfectly clean. The device is especially adapted for use upon the tubes of locomotive boilers because of the difficulty experienced in overcoming the obstructions caused by the arch. In this instance, it is not necessary to remove the arch, but the device can be introduced over the top of the arch and by means of the adjustable nozzle can be introduced into the ends of the tubes at the bottom of the boiler or at the sides thereof with a facility equal to that with which it can be introduced into those at the top or middle. A great saving in expense and time results.

When steam is used in preference to compressed air, the heat and moisture are both absorbed by the air which enters through the pipe 14, so that the current which issues from the nozzle consists of dry heated air free from moisture thus avoiding the objection which might be made that the introduction of a heated and moist current into the tubes of the boiler might cause pitting of the tubes.

In case it is found that the tube being operated upon is scaled to any considerable extent, it may be found necessary to use sand in the cleaning process which is easily effected by introducing the lower end of the pipe 14 into a box or other supply of sand whence the sand is carried by the air drawn into the pipe by the vacuum and forms part of the centrifugal rotary current discharged into the tube and effectively removes the scales. Should a tube be found to be fully closed, the obstruction can be removed and the tube cleaned by closing and quickly opening the valve 4, the sudden impact of the current upon the obstruction generally removes it but, should the first impact of the current fail to do so, repeated closing and opening of the valve 4 will finally effect it. The tube cleaner may also be used for the purpose of washing boiler tubes with hot water, the pipe 13 being connected with the boiler or steam supply and the hose 14 with supply of cold water. The water heated by the steam before it leaves the pipe is introduced into the tube through the nozzle in the same manner as the air already described.

My appliance is of great utility upon locomotives not only for the purposes already stated, but also for extinguishing fires along the road bed of the road or in cars composing a train, the pipe 13 in such case being connected with the compressed air hose or with the boiler and the pipe 14 with the water of the tender. The water thrown through the nozzle covers, a short distance therefrom, a space of many feet in diameter.

What I claim is:

1. In a device for cleaning boiler tubes, a pipe provided with suitable means of connection with a steam or compressed air supply and a conical nozzle at the operative end of said pipe, together with means whereby said nozzle may be moved independently of said pipe at various angles therewith, substantially as described.

2. In a device for cleaning boiler tubes, a pipe with suitable means of connection with a steam or compressed air supply, a movable nozzle at the operative end, suitable means of connection with the outer air located between said nozzle and said connection with said steam or compressed air supply, substantially as described.

3. In a device for cleaning boiler tubes, the combination of a pipe provided with means of connection with a reservoir of compressed air or steam, means of connection with the outer air, a contraction between the opening for the entrance of the compressed air or steam and the opening for the entrance of the outer air, together with a conical nozzle, all substantially as described.

4. In a device for cleaning boiler tubes, the combination of a pipe provided with means of connection with a reservoir of compressed air or steam, means of connection with the outer air, a contraction of said pipe between the opening for the entrance of the compressed air or steam and the opening for the entrance of air, means within said pipe whereby the current passing through the same may be given a rotary motion and a conical nozzle, all substantially as described.

5. In a device for cleaning boiler tubes, a pipe provided with means of connection with a reservoir of compressed air or steam and a conical nozzle combining a hollow truncated cone opened at the top and closed at the base with an opening in the latter for the reception of a pipe and an inverted cone fixed within said first named cone, the diameter of the base of said inverted cone being less than the opening opposite the base of said truncated cone, said nozzle being so connected with said pipe as to permit the movement of said nozzle in any direction independently of said pipe, substantially as described.

6. In a device for cleaning boiler tubes, a pipe provided with means of connection with a reservoir of compressed air or steam, means of connection with the outer air and a conical nozzle having within an inverted cone so fixed as to provide an annular opening for said nozzle and means of connection between said nozzle and said pipe whereby the movement of said nozzle may be effected independently of said pipe, substantially as described.

In testimony whereof, that I claim the foregoing as my invention I have hereunto set my hand this twenty-third day of June, A. D. 1906.

FRANK W. CANALES.

Signed in presence of—
  A. G. McPherson,
  Geo. E. Bird.